United States Patent

[11] 3,568,059

| [72] | Inventor | Frank J. Sordello |
| | | San Jose, Calif. |
| [21] | Appl. No. | 792,386 |
| [22] | Filed | Jan. 21, 1969 |
| [45] | Patented | Mar. 2, 1971 |
| [73] | Assignee | Information Storage Systems, Inc. |
| | | Cupertino, Calif. |

[54] ELECTRONIC TACHOMETER
9 Claims, 6 Drawing Figs.
[52] U.S. Cl................................................. 324/177,
317/5
[51] Int. Cl.................................................. G01p 3/46
[50] Field of Search........................................ 324/69, 70;
318/393—398, (Inquired); 317/5; 73/490, 503;
324/130; 235/151.32, 183

[56] References Cited
UNITED STATES PATENTS
2,934,267 4/1960 Wirkler........................ 235/151.32
3,359,477 12/1967 Wasai........................... 318/395

*Primary Examiner*—Michael J. Lynch
*Attorney*—Robert B. Crouch

ABSTRACT: An electronic tachometer for providing a continuous indication of velocity of a motor-driven load including: a sensor operatively connected to the load for generating a periodic position signal; means for converting the position signal to an accurate indication of load velocity; a sample and hold circuit for periodically sampling the velocity measurement and retaining the level of the sample; an integrator for integrating the drive current applied to the motor; and a junction for recalibrating the integrated drive current with each retained sample to form a continuous velocity signal.

3,568,059

INVENTOR.
Frank J. Sordello
BY Robert B. Crouch

ELECTRONIC TACHOMETER

BACKGROUND

Conventional lineal tachometers are usually elongated, tubular structures which consist of a cylindrical coil of very fine wire wound on a coil form and a permanent magnet movable within the coil. The typical tachometer is bulky in relation to its usable length, in that, the usable portion is limited to that segment of the coil which operates in the linear zone. In the typical lineal tachometer, the usable length turns out to be approximately 25 percent of the overall length of the tachometer. The conventional tachometer is difficult to calibrate, in part because the location of the linear zone varies from device to device and it is necessary for the user to locate and define the usable zone. In addition, since the movable magnet rides within a nylon sleeve, the tachometer is subject to wear. The magnet will in time wear through the sleeve and make direct contact with the turns of the coil, thus destroying its usefulness. Furthermore, in an environment which involves magnetic fields, unwanted voltages are induced into the tachometer causing inaccuracies in the output signal.

INVENTION

The present invention avoids the shortcomings of the prior known devices by provision of a tachometer which is accurate, is insensitive to wear and is economical to build and operate. This is accomplished by provision of an electronic tachometer for providing an output signal which is proportional to the velocity of an actuator-driven load as it is moved from one position to another, including, means for producing a discontinuous but extremely accurate position-derived signal, means for producing a continuous but DC drift-sensitive acceleration-derived signal, and means for combining the two signals to form a continuous and accurate indication of the velocity of the load, the last-named means including means for periodically correcting the acceleration-derived signal with the position-derived signal. Objects and many of the attendant advantages of this invention will be readily understood by reference to the following detailed description of embodiments of the invention as illustrated in the accompanying drawings wherein:

Figure 1:
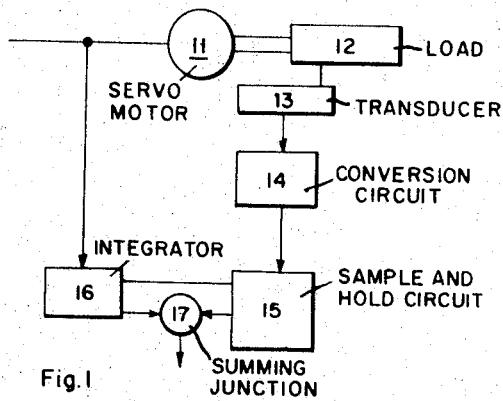
FIG. 1 is a schematic view of circuitry in block diagram form for carrying out the function of the present invention.

In the present invention, as illustrated in FIG. 1, an intermittent signal having a high degree of accuracy is combined with a continuous signal which is subject to DC drift, in order to produce a velocity signal which is both accurate and continuous. In the block diagram of FIG. 1, a servomotor 11 is drivingly connected to a load 12 which may, for instance, be one or more read/write heads mounted for movement radially of a recording disc member. A transducer 13 is operatively connected to the load to produce a periodically varying signal indicating position of the load. The position signal from the transducer is transmitted to a conversion block 14 in which it is converted from a position indication to a measurement of velocity. The velocity signal is then directed to sample and hold circuitry 15 where it is sampled periodically and an indication of the magnitude or level and polarity of the sample maintained, or held, from one sample to another. The samples which form the output signal of the circuit 15 provide an accurate but intermittent indication of the velocity of the load. Such signals are of little use in directly controlling acceleration and deceleration of the motor to accomplish a desired movement of the load, because of the time between corrections, i.e., samples. A continuous velocity signal can be developed from the current applied to the motor based on the following relationship:

$KI = F$, where $K =$ motor constant in pounds per amp
$F =$ force of the motor
$I =$ motor current
$F = ma$,
$m =$ mass of the system
$a =$ acceleration
$I = ma/K$ Since $m$ and $K$ are constants, $I$ is proportional to $a$. Accordingly, a current signal is developed which is proportional to the current applied to the motor and is applied to an integrator 16. Since the motor current is directly proportional to the acceleration of the mass (load), the integral of the motor current will be directly proportional to the velocity of the mass. The integration process is continuous, so the velocity signal output is likewise continuous. However the signal is not suitable for control of the acceleration-deceleration characteristics of the motor, since it is subject to DC drift and it becomes progressively more inaccurate with time. While the integrated signal cannot be used directly, it can be combined with the output from the sample and hold circuitry to provide a continuous and accurate velocity signal. Accordingly, the integrated signal is reset or calibrated to the level of the output of the circuitry 15 in a junction 17 to produce a continuous velocity signal. The output from the sample and hold circuitry 15 is supplied to the integrator, so that the integrator is corrected to the level of each successive sample. The integration starts at the level of the most recent sample and continues until the next sample, at which time the integrator is reset to the level of the new sample and the integration process begins anew. This means that the gaps between successive samples are filled with the integrated acceleration signal to produce a continuous and accurate indication of velocity which is highly suitable for control of the acceleration and deceleration of the motor.

Figure 2:
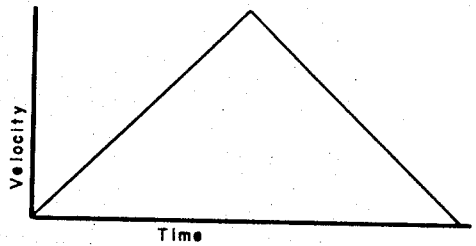
FIG. 2 is a plot of velocity versus time in a typical high performance servomotor.

FIG. 2 shows the variation of velocity with time in a typical bang-bang servo. In the ideal case the velocity increases at a uniform maximum rate until the midpoint of the distance over which the load is being moved. The velocity then decreases at a similar rate until it reaches zero as the load arrives at the desired location.

Figure 3:
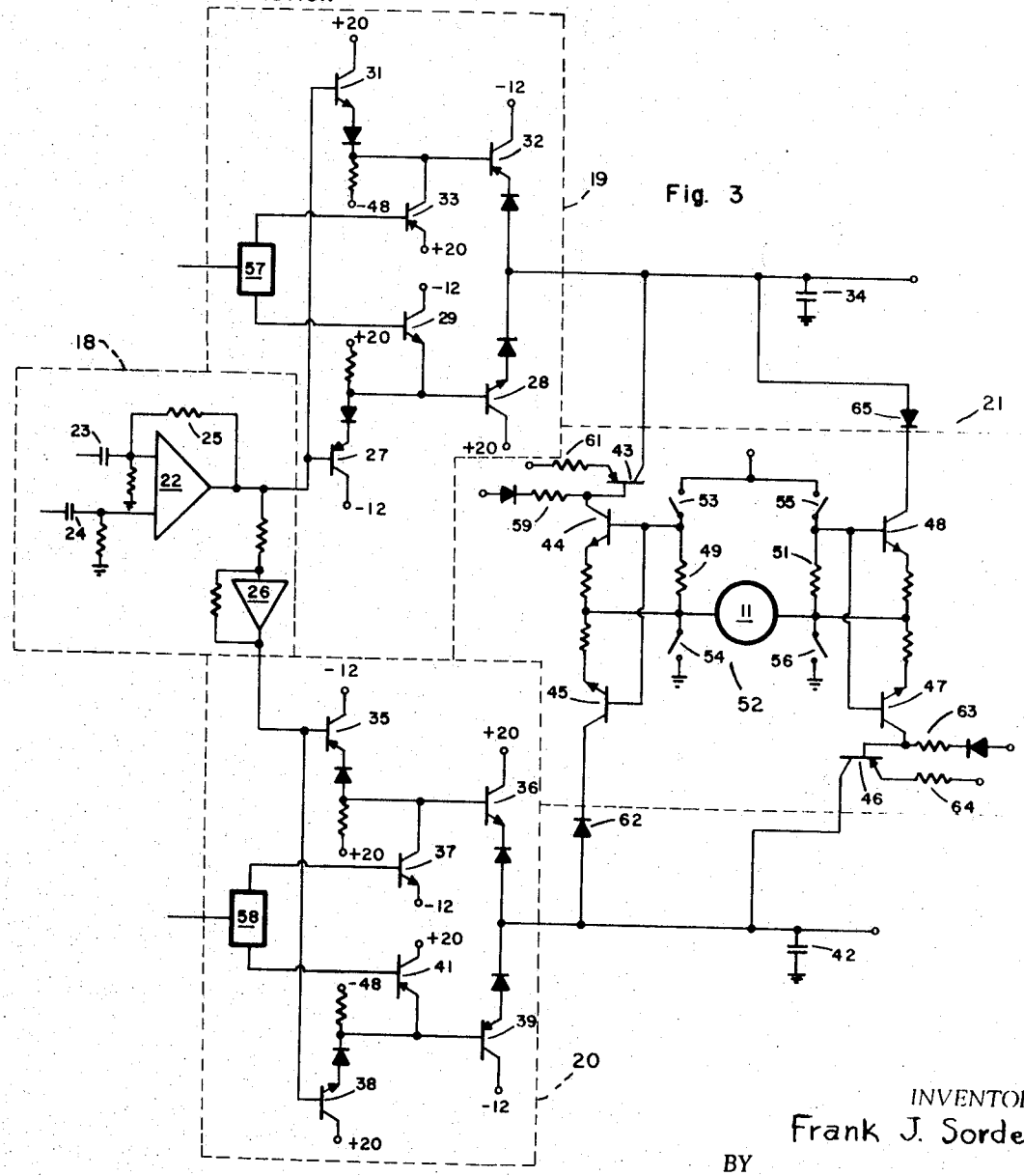
FIG. 3 is a circuit diagram of a preferred embodiment of the invention.

As shown in FIG. 3, a preferred embodiment of the present invention includes a differentiator 18, a pair of sample and hold circuits 19 and 20 and an integration stage shown at 21. The differentiator is a commercially available operational amplifier 22 which is connected in a differentiator configuration. This hookup includes a differential input through capacitors 23 and 24 and a resistor 25 connected in the feedback loop. The output from the differentiator is connected directly to the sample and hold circuit 19 and is connected through a one-to-one amplifier 26 to the sample and hold circuit 20. The sample and hold circuits 19 and 20 are identical and each includes two complementary pairs of emitter followers connected to a capacitor. The emitter followers of each pair are cascaded together through a transistor switch. Circuit 19 includes a first pair of emitter followers 27 and 28 connected through a transistor switch 29, and a complementary pair of emitter followers 31 and 32 through a transistor switch 33. Both pairs of emitter followers are connected by a common lead to a capacitor 34. Circuit 20 includes a first pair of emitter followers 35 and 36 connected through a transistor switch 37, and a complementary pair of emitter followers 38 and 39 connected through a transistor switch 41. Both pairs of emitter followers are connected by a common lead to a capacitor 42.

The integration stage includes two sets of three transistors 43, 44 and 45 and 46, 47 and 48 which monitor the current in the load positioning motor by sensing voltage across resistors 49 and 51. Current is supplied to the motor 11 through a bridge 52 which includes switches 53, 54, 55 and 56.

Figure 4:
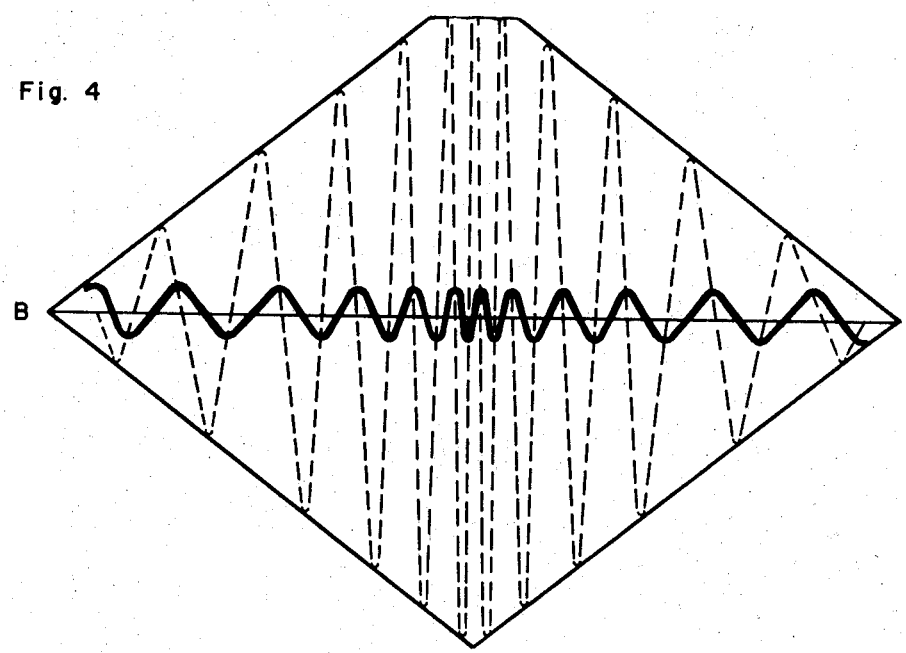
FIG. 4 is a chart illustrating the operation of portions of the circuitry of FIG. 3.

Referring to FIG. 4 of the drawing, the position signal derived from transducer 13, is a continuous, alternating waveform which is alternately above and below a base line B. The waveform may be triangular or, as in this case, may be a sine wave. The positive-going intersections of the wave form with the base line are selected as the sample times for the sample and hold circuits. The transducer may be calibrated such that a recurring portion of the waveform will correspond with increments of movement of the load. For instance, in the case of a recording disc the positive-going intersections may indicate the centerlines of the concentric recording tracks on the disc surface. The transducer signal is differentiated by differentiator 18 which produces the varying amplitude curve shown in broken line. The peaks of the differentiated curve which correspond to the positive-going intersections of the sine wave follow very accurately the envelope of the velocity curve depicted in FIG. 2.

In the operation of the embodiment of FIG. 3, the two sample and hold circuits, 19 and 20, provide a differential output from the tachometer. If, in a given case, a differential output is not desired, one of the sample and hold circuits may be omitted. In the embodiment shown the transistor switches 29, 33, 37, and 41 are controlled by a train of pulses which may be derived from the transducer signal or from any suitable timing source. In the present case the leading edges of the pulses of the pulse train occur simultaneously with the positive-going intersections of FIG. 4. As indicated each sample and hold circuit includes two complementary pairs of emitter-followers—one of which charges the associated capacitor in a positive direction while the other charges the capacitor in a negative direction. The pulse trains are applied to the sample and hold circuits through suitable level shifting circuitry shown in diagrammatic form at 57 and 58. The output of the differentiator 18, i.e., the broken line curve of FIG. 4, is applied directly to the sample and hold circuit 19 and is inverted in the amplifier 26 and applied to the sample and hold circuit 20. In each sample and hold circuit the emitter followers of each pair are cascaded together through the associated transistor switch during the sample portion of operation and are disconnected during the hold portion. At the leading edge of each pulse, each transistor switch makes the connection between the associated emitter-followers and allows the associated capacitor to be charged to the level of the differentiator output. At the trailing edge of the pulse the transistor switch interrupts the connection between the emitter-followers and forces a reverse bias on the base-emitter junction of each emitter-follower of the pair, thereby causing the associated capacitor to hold the last value to which it had been charged. Whether the instant sample is more positive or more negative than the immediately preceding sample determines which pair of emitter-followers is used to charge the capacitor. Referring to FIG. 4, one pair of emitter-followers will be used to charge the capacitor during the acceleration portion of the move while the other pair of emitter-followers will be used to charge the capacitor in the opposite direction during the deceleration portion of the move.

When the motor 11 is driving the load in a forward direction switches 53 and 56 of the bridge are closed and current is applied to the motor through the left side of the bridge producing a voltage across the resistor 49. Occurring at all times, but of significance during the hold portion of the sample and hold operation, the voltage across resistor 49 causes transistor 44 to conduct, thus causing a voltage across resistor 59 which in turn causes transistor 43 to conduct. When transistor 43 becomes conductive it produces a current in resistor 61 and conducts the current into the capacitor 34. The voltage thus developed across the capacitor 34 is the integral of the motor current. The voltage across resistor 49 also turns on transistor 45 which conducts current through diode 62 away from capacitor 42, thus reducing the charge on that capacitor. When the motor is driving the load in the reverse direction, switches 53 and 56 are open and switches 55 and 54 are closed, so current is applied through the right side of the bridge which produces a voltage across the resistor 51. This voltage turns on transistor 47 causing a voltage across resistor 63 which turns on transistor 46. A current is then produced in resistor 64 which is conducted by transistor 46 into capacitor 42. At the same time the voltage in resistor 51 turns on transistor 48 which conducts current from capacitor 34 through a diode 65.

Figure 5:
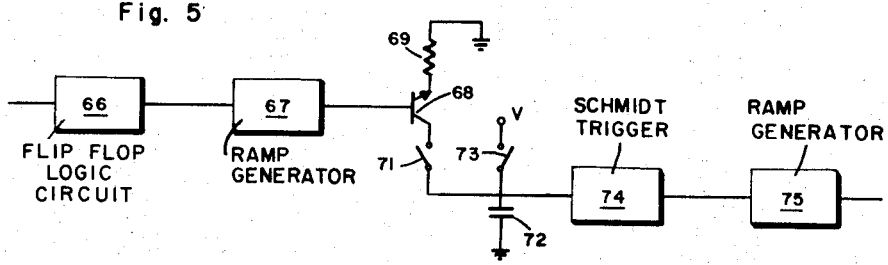
FIG. 5 is a block diagram of an alternative form of the invention.
Figure 6:
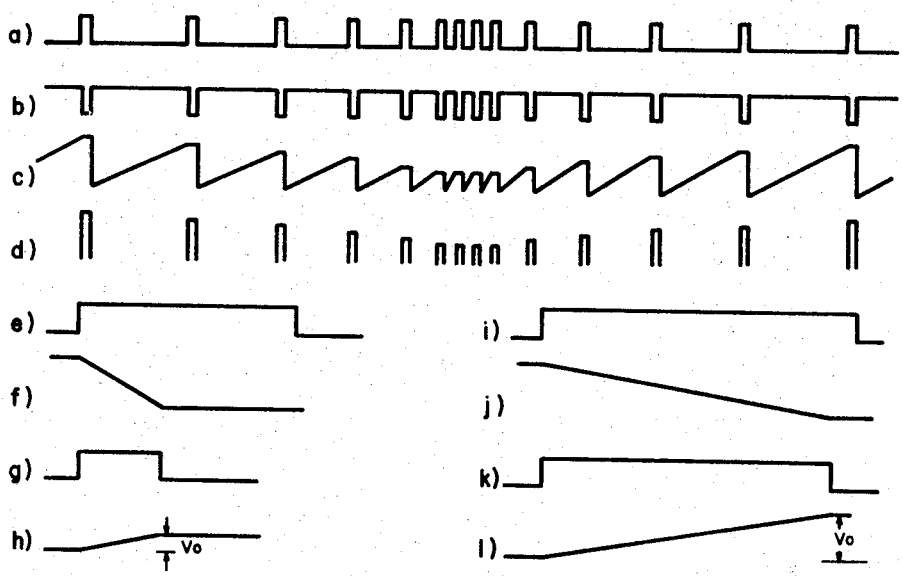
FIG. 6 is a series of waveforms produced by the circuitry of FIG. 5.

An alternative embodiment of an electronic tachometer is illustrated in FIG. 5 as including a flip-flop and associated logic 66, a ramp generator 67 and a current source circuit which includes a transistor 68 connected through an emitter resistor 69 to ground. A switch 71 connects the collector of the transistor to a capacitor 72 which is connected between ground on one side and through a switch 73 to a constant source of voltage V on the other side. The capacitor is further connected in series with a Schmidt trigger 74 and a ramp generator 75. This embodiment is described in the context of a disc file environment wherein it converts track-crossing pulses to indications of velocity. In a disc file environment, data is recorded in concentric tracks on either surface of a rotating disc. The tracks are spaced at a density of from 50 to 100 tracks per inch. The magnetic read/write heads are mounted on arms which are moved radially of the discs. As a head is moved from one track location to another, it may cross a plurality of intervening tracks. A pulse can be derived from the head or from a separate transducer each time the head crosses one of the intervening tracks. A train of such track-crossing pulses which have been shaped to be of equal width is shown in waveform a of FIG. 6. Waveform a is applied to the flip-flop and its associated logic 66 which in effect inverts it to provide a gating signal shown in waveform b. In waveform b the level of the signal is raised between pulses to provide a square wave whose length varies with the time between the pulses of waveform a. Each of the square waves of waveform b provides a gate for controlling the ramp generator 67. The ramp generator is set to zero by the leading edge of each square wave of waveform b. As shown in waveform c the signal level of the ramp generator then rises until interrupted by the trailing edge of the square wave and remains constant at that level until it is reset to zero by the leading edge of the subsequent square wave. The voltage level of the ramp generator output $$V_c = K_a \Delta t_1$$

where $K_a$ = constant of ramp generator 67

$\Delta t_1$ = time between track crossing pulses since $x$ (velocity) is proportional to $1/t_1$ then $V_c = K_a/x$. Voltage level $V_c$ is converted to the current level in transistor 68 according to the relationship of $I_d = V_c/R$ where $R$ equals the resistance of resistor 69. By substitution then $I_d = K_a \Delta t_1/R$. The current level produced by transistor 68 is illustrated in waveform $d$ and is used to discharge capacitor 72. Switch 71 is closed by the leading edge of each track crossing pulse and is opened by the Schmitt trigger. Switch 73 is closed by the Schmitt trigger and is opened by the leading edge of each track crossing pulse. When switch 73 is closed it allows capacitor 72 to be charged to the level of the constant voltage source $V$. When switch 73 is open and switch 71 is closed capacitor 72 is discharged from $V$ to zero at a rate determined by $I_d$ as illustrated by the remaining waveforms. Waveforms $e$ and $i$ illustrate track crossing pulses of waveform $a$ at a greatly enlarged scale. Taking one of the larger period pulses of waveform $d$, waveform $f$ illustrates the discharge of capacitor 72 from voltage level $V$ to zero. Trigger 74 is set by the leading edge of the track crossing pulse and then reset when capacitor 72 discharges to zero, indicated in waveform $g$. Trigger 74 thus produces a gate which controls the timing of ramp generator 75 as indicated in waveform h. Taking another example, with a lower period pulse of waveform a the capacitor 72 is is discharged for a longer period of time as shown in waveform j. Trigger 74 produces a longer gating signal as shown in waveform k which allows generator 75 to rise to the voltage level shown in waveform l. This action is based on the relationship of $$I_d = CV/\Delta t$$

where
C = capacitance of capacitor 72
V = fixed voltage level
$\Delta t_2$ = time of discharge of capacitor 72

$$t_2 = CV/I_d$$
$$= \frac{CV}{K_a \Delta t_1/R}$$
$$= \frac{CV\dot{x}}{K_a R}$$

Then the output voltage of ramp generator 75, $$V_0 = K_b \Delta t_2$$
$$= \frac{K_b CV}{K_a/R} \dot{x}$$

where $K_b$ is the constant of the ramp generator 75. Therefore, the output from the ramp generator, $V_o$, is proportional to the velocity, since the other quantities in the equation are constant. The circuitry illustrated can thus be employed to produce indications of velocity from track crossing pulses as long as the longest time required to charge the capacitor C is less than the shortest time between track crossing pulses. The circuitry produces voltage levels which are accurate indications of velocity at each track crossing. The circuitry can thus be used in place of the differentiation stage 18 of FIG. 3.

While the embodiments of FIG. 3 and 5 have been described as applicable to disc file environments, they are intended to have general application to closed-loop control systems. The embodiment of FIG. 3 has particular applicability to applications where a sine or triangular-type wave position signal is available, whereas the embodiment of FIG. 5 has particular applicability to applications where a digital position signal is available.

The invention has been particularly shown and described with reference to preferred embodiments thereof, but it will be understood by those skilled in the art that various changes in the form and details may be made therein without departing from the spirit and scope of the invention.

I claim:

1. A tachometer for providing a continuous indication of velocity of a motor driven load relative to a member, said tachometer comprising:
   first means operatively connected to said load for producing an intermittent signal directly proportional to the instantaneous velocity of said load to said member;
   second means operatively connected to said motor and responsive to changes in the velocity of said motor for producing a continuous signal proportional to the instantaneous velocity in the load relative to the member; and
   third means operatively connected to said first and second means for periodically resetting said continuous signal to a level proportional to said intermittent signal.

2. A tachometer as defined in claim 1, wherein:
   the first means includes means for generating a periodic signal responsive to the relative position of the load and member; means for converting the periodic signal to an accurate indication of load velocity relative to the load; and means for periodically sampling the periodic velocity signal and retaining the sample for combination with the continuous signal.

3. A tachometer as defined in claim 1, wherein the second means includes means for integrating a function of the acceleration of the motor to provide the continuous velocity signal.

4. A tachometer as defined in claim 3, wherein:
   the first means includes a transducer associated with the load for generating a continuous alternating signal indicating the position of the load relative to the member; means for differentiating the position signal to produce a velocity signal; and means for sampling the differentiated signal at regular intervals and for retaining the sampled signal for combination with the continuous signal.

5. A tachometer as defined in claim 4, wherein:
   the means for differentiating includes an operational amplifier connected in a differentiator configuration; and
   the means for sampling includes a capacitor and means for charging the capacitor in one direction during acceleration and in the opposite direction during deceleration.

6. A tachometer as defined in claim 5, wherein: the means for charging the capacitor includes two complementary pairs of emitter-followers, one of which charges the capacitor in a negative direction, and a transistor switch connected between the emitter-followers of each pair, the switchs being controlled by a pulse train derived from the position signal to cascade the emitter-followers of each pair together during the sample portion of the sample and hold position.

7. A tachometer as defined in claim 3, wherein: the first means includes a transducer associated with the load for generating a digital signal indicating position of the load; circuitry for converting the digital position signal to a velocity signal; and sample and hold circuitry for sampling the velocity signal at regular intervals and retaining the sample.

8. A tachometer as defined in claim 7, wherein: the circuitry includes means for generating a current which is inversely proportional to velocity; and means for generating a voltage which is directly proportional to velocity from the current.

9. A tachometer as defined in claim 8, wherein: the means for generating a voltage includes a capacitor connected between two fixed voltage levels, the capacitor being connected to be discharged by the current; means for generating a gating signal proportional to the time of discharge of the capacitor; and ramp generating means controlled by the gating signal for producing a voltage directly proportional to velocity.